W. O. PEAVEY.
RICE HULLING MACHINE.
APPLICATION FILED MAR. 13, 1918.
1,323,906.
Patented Dec. 2, 1919.
2 SHEETS—SHEET 1.
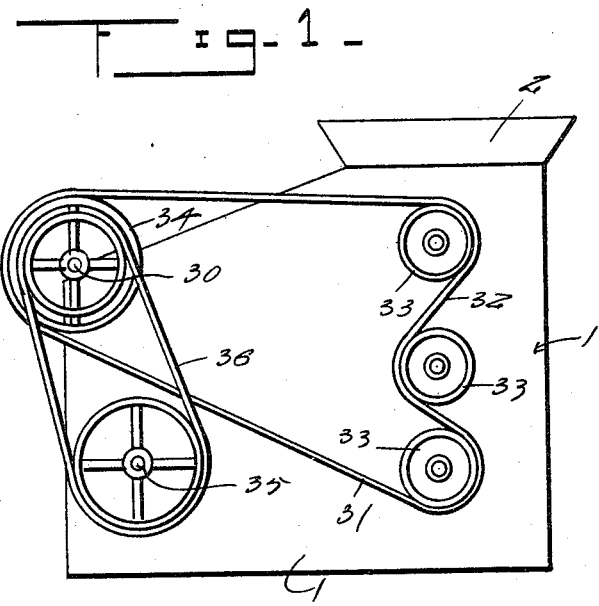
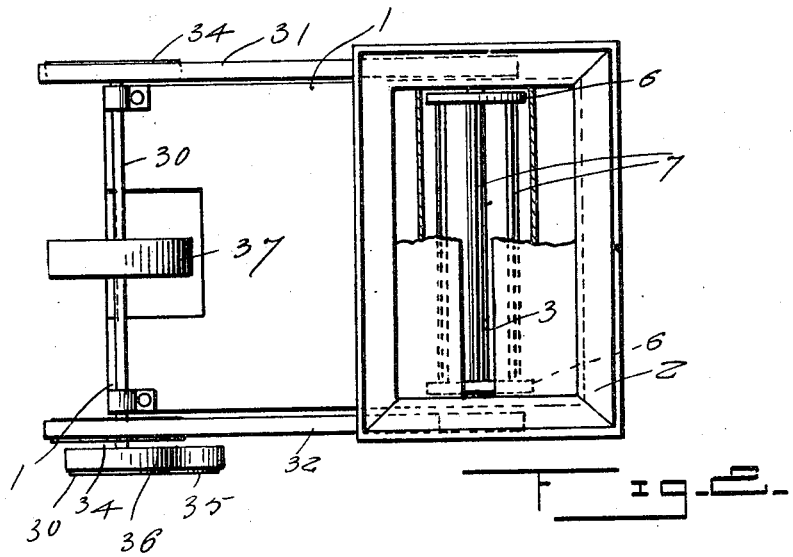
Inventor
W. O. Peavey.
Witnesses

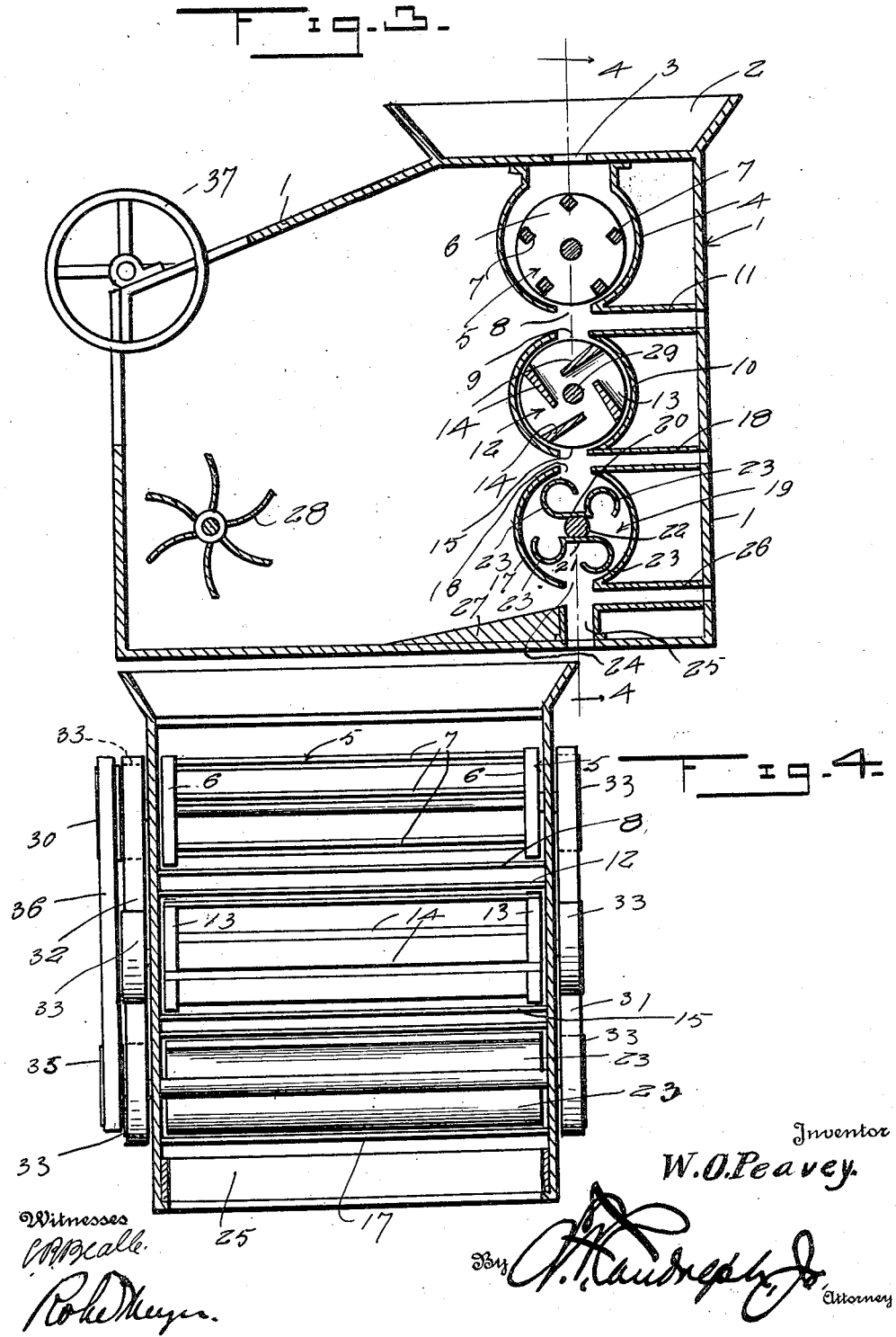

UNITED STATES PATENT OFFICE.

WILLIAM O. PEAVEY, OF EBRO, MINNESOTA.

RICE-HULLING MACHINE.

1,323,906. Specification of Letters Patent. Patented Dec. 2, 1919.

Application filed March 13, 1918. Serial No. 222,135.

*To all whom it may concern:*

Be it known that I, WILLIAM O. PEAVEY, a citizen of the United States, residing at Ebro, in the county of Clearwater and State of Minnesota, have invented certain new and useful Improvements in Rice-Hulling Machines; and I do hereby declare the following to be a full, clear, and exact description of the invention, such as will enable others skilled in the art to which it appertains to make and use the same.

This invention relates to a thresher or hulling machine particularly designed for threshing wild rice, and the primary object of the invention is to provide a machine of this type which includes a plurality of cylinders, each carrying different types of rice engaging means, for effectively hulling or threshing the wild rice, and to arrange this plurality of cylinders so that the rice falling from one cylinder to the next will be subjected to an air blast for blowing the fine particles of straw and chaff out of the machine.

More specifically, this invention includes a final hulling or threshing cylinder structure comprising a hollow drum or cylinder in which a rotor is mounted which rotor comprises a plurality of plates having curved portions which are adapted to engage the rice grains or kernels and rub them against the interior of the cylinder in which the rotor rotates until the hulls are all rubbed from the kernels, at which time the kernels, owing to their hardness and smoothness will slip from engagement with the curved portions of the plate and fall out of the cylinder into the delivery trough of the thresher, during which movement they will be subjected to an air blast for blowing the fine particles of chaff out of the rice.

With the foregoing and other objects in view this invention consists in such novel features of construction, combination and arrangement of parts as will be hereinafter more fully described, illustrated in the accompanying drawings and claimed.

In decribing the invention in detail, reference will be had to the accompanying drawings wherein like characters designate like and corresponding parts throughout the several views and in which:

Figure 1 is a side elevation of the improved rice thresher

Fig. 2 is a top plan of the thresher

Fig. 3 is a vertical section through the thresher and

Fig. 4 is a transverse vertical section through the thresher taken on the line 4—4 of Fig. 3.

Referring more particularly to the drawings, 1 designates the casing or housing of the thresher which has a hopper 2 carried by the upper end of the same in which the rice to be threshed is placed. The hopper 2 delivers the rice, through an opening 3 into a cylinder 4. The rice falling into the cylinder 4 is subjected to a beating operation by the rotation of a rotor 5. The rotor 5 includes end plates or disks 6, which have a plurality of rectangular rods 7 attached thereto and extending from one disk to the other. The rectangular rods 7 are spaced circumferentially about the disk 6, and their corners engaging the rice will have a tendency to break up any particles of straw and perform the initial operation of separating the kernels of rice from the hulls or chaff. The rice falls from the cylinder 4 through an opening 8 formed therein, and through an opening 9 into a second cylinder 10. During the passage of the rice from the cylinder 4 into the cylinder, it is subjected to an air blast, which will blow the fine particles of straw and chaff outwardly through a chute or flue 11, which communicates with the atmosphere exteriorly of the casing or body 1 of the thresher.

A rotor 12 is positioned within the cylinder 10 and this rotor comprises ends 13 which have a plurality of bars 14 attached thereto and extending from one disk to the other. The bars 14 are positioned angularly with respect to the radii of the disk, as clearly shown in Fig. 3 of the drawings, and their sides taper as they extend inwardly. These boards or plates 14 provide a greater area for striking the rice, and during the rotation of the rotor 12 the rice will be thrown, from one of the plates or bars against the other, and so on about the entire circumference of the rotor during the rotation thereof. This throwing against the bars 14 will have a tendency to shake loose any particles of the hull or chaff which might be clinging to the seed or kernel after they had left the cylinders 4. The rice and chaff falls from the cylinder 10 through an opening 15, and through a second opening 16 into the final cylinder 17. During the passage of the rice and chaff from the cylinder 10 into the cylinder 17 it is again subjected to an air blast which blows the fine particles of chaff outwardly though a flue 18 which also has communication with the air exteriorly of the casing 1.

A rotor 19 is positioned within the cylinder 17 and it has a pair of plates 20 and 21 attached to the shaft 22 thereof. The edges of the plates 20 and 21 are rolled to form segments of cylinders, as shown at 23 and portions of these rolled edges are positioned so that they will lie in close proximity to the inner surface of the cylinder 17 for engaging the kernels of rice between the curved portions 23 and the inner wall or surface of the cylinder 17 to rub any particles of the hull from the kernel which might still be clinging thereto. The thoroughly threshed or hulled rice falls from the cylinder 17 through an opening 24 into the delivery chute 25 of the thresher from which it may pass into any suitable type of retaining receptacle. During the passage of the rice from the cylinder 17 to the delivery chute 25 it is again subjected to an air blast which blows the last fine particles of chaff outwardly through a flue 26, thereby efficiently separating all the chaff or hulls from the rice kernel. A guiding board 27 is mounted upon the inner surface of the bottom of the housing 1 for guiding the air blast from the fan structure 28 upwardly to the open receiving end of the flue 26.

The shafts 28, 29, and 22 of the rotary structures 5, 12 and 19 respectively are rotated from a power shaft 30, by belts 31 and 32 one of which is positioned upon each side of the body 1. The belts 31 and 32 pass about pulleys 33 mounted upon the various shafts and about pulleys 34 which are mounted upon the power shaft 30. The fan 28 which creates the air blast through the flues 11, 18 and 26 is rotated by the rotation of the shaft 35 which is in turn rotated from the shaft 30 by suitable belt and pulley constructions 36. The power shaft 30 has a pulley 37 mounted thereon which may be connected to any suitable type of prime mover.

In reducing the invention to practice, certain minor features of construction combination and arrangement of parts may necessitate alterations to which the patentee is entitled provided such alterations are comprehended within the scope of what is claimed.

What is claimed is:

In a machine of the character stated, a supporting housing, a plurality of casings mounted in said housing and disposed in a vertical series, said casings being spaced apart, each of the casings being provided with an upper grain receiving opening and a lower grain discharge opening whereby grain may pass by gravity through the successive casings of the series, air escape flues communicating with the spaces between said casings, rotors operative in the casings and adapted to hull and clean grain passed therethrough, and means for causing blasts of air to flow between said casings and through the air escape flues so as to separate lighter particles of materials from grain flowing through the series of casings.

In testimony whereof I affix my signature in presence of two witnesses.

WILLIAM O. PEAVEY.

Witnesses:
 WESLEY A. HARDIN,
 HENRY STARKEY.